US011831123B2

(12) United States Patent
Langseth et al.

(10) Patent No.: US 11,831,123 B2
(45) Date of Patent: Nov. 28, 2023

(54) SBS SUPPRESSION AND ELECTRONIC PATH LENGTH MATCHING IN COHERENT BEAM COMBINING

(71) Applicant: Massachusetts Institute of Technology, Cambridge, MA (US)

(72) Inventors: Jason E. Langseth, Malden, MA (US); Andrew Benedick, Stow, MA (US); Seth Trotz, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 326 days.

(21) Appl. No.: 17/195,115

(22) Filed: Mar. 8, 2021

(65) Prior Publication Data

US 2021/0351559 A1   Nov. 11, 2021

Related U.S. Application Data

(60) Provisional application No. 63/021,933, filed on May 8, 2020.

(51) Int. Cl.
*H01S 3/00* (2006.01)
*H01S 3/23* (2006.01)
*H01S 3/13* (2006.01)

(52) U.S. Cl.
CPC .......... *H01S 3/2308* (2013.01); *H01S 3/1305* (2013.01); *H01S 3/1307* (2013.01)

(58) Field of Classification Search
None
See application file for complete search history.

(56) References Cited

U.S. PATENT DOCUMENTS

2020/0350737 A1*  11/2020  Beresnev .............. H01S 3/2383
2021/0103152 A1*  4/2021   Goodno ............. G02B 27/0922

OTHER PUBLICATIONS

Benedick et al., Simple Non-PM Base Beam Combination Architecture, Optical Society of America, 2014, pp. 1-2 (Year: 2014).*
(Continued)

*Primary Examiner* — Mark Hellner
(74) *Attorney, Agent, or Firm* — Smith Baluch LLP (57) ABSTRACT

In coherent beam combining, the beams can be phase-modulated with a pseudo-random bit sequence (PRBS) to prevent stimulated Brillouin scattering (SBS) downstream. To coherently combine the phase-modulated beams, however, the PRBS waveforms should be true-time-delayed to within a small fraction of the bit duration. Traditionally, this true time delay is achieved by cutting optical fibers to length or with optical trombones. But trimming fibers is hard to do precisely, and optical trombones have large insertion loss. In addition, the path length mismatch varies as the fibers heat up and/or vibrate. Here, the beams are generated from a kilohertz linewidth seed split among N>1 (e.g., N=100) arms. Each arm is phase-modulated with a separate copy of the unique PRBS pattern. The relative phase of the PRBS patterns is stabilized by phase-locking the master oscillators used to read out the PRBS patterns. The PRBS patterns can be phase shifted with respect to one another to compensate for physical path length mismatches of the optical fibers. Scanning the relative phase of the PRBS pattern used to modulate different arms yields a cross-correlation peak in combined power when the phases are matched at the combination plane.

19 Claims, 7 Drawing Sheets

(56) References Cited

OTHER PUBLICATIONS

Anderson et al., "Beam combining and SBS suppression in white noise and pseudo-random modulated amplifiers." Fiber Lasers XII: Technology, Systems, and Applications. vol. 9344. International Society for Optics and Photonics, 2015. 9 pages.

Anderson et al., "Comparison of phase modulation schemes for coherently combined fiber amplifiers." Optics express 23.21 (2015): 27046-27060.

Redmond et al., "Active Coherent Combination Using Hill Climbing-Based Algorithms for Fiber and Semiconductor Amplifiers." Coherent Laser Beam Combining (2013): 103-136.

Shay et al., "First experimental demonstration of self-synchronous phase locking of an optical array." Optics express 14.25 (2006): 12015-12021.

* cited by examiner

SBS SUPPRESSION AND ELECTRONIC PATH LENGTH MATCHING IN COHERENT BEAM COMBINING

CROSS-REFERENCE TO RELATED APPLICATION (S)

This application claims the priority benefit, under 35 U.S.C. 119(e), of U.S. Application No. 63/021,933, which was filed on May 8, 2020 and is incorporated herein by reference in its entirety for all purposes.

GOVERNMENT SUPPORT

This invention was made with government support under FA8702-15-D-0001 awarded by the U.S. Air Force. The government has certain rights in the invention.

BACKGROUND

Fiber amplifiers operating at about 1.5 kW and about 15 GHz linewidth have been available since the mid-2000s. The beams from several of these fiber amplifiers can be combined coherently such that the fiber amplifiers form a High Energy Laser (HEL) system. A spectral linewidth of 15 GHz enables suppression of stimulated Brillouin scattering (SBS) in the fiber amplifiers; however, use of such broadband optical signals in beam combination systems also requires precise and very time consuming matching of the optical path lengths of the fibers in the beam-combining interferometer along with a way to dynamically adjust the optical path lengths to compensate for amplifier operation and construction differences. Static or dynamic path length mismatches greater than the coherence length of the light source (e.g., a few millimeters for a 15 GHz source) time-decorrelate the electric field components at the beam combination plane, degrading the combination efficiency. Scaling to higher single-amplifier powers by increasing the spectral width is very challenging as the coherence length quickly becomes shorter than the differential path length changes between amplifiers that occur under normal operating conditions.

SUMMARY

Electronically tuning the delay of the modulation applied to different arms of the coherent beam combining system circumvents bandwidth scaling compatibility problems and the time-consuming nature of the current path length matching methods used in coherent beam combining systems. Applying the phase modulation signal to each arm of the array allows electronic path length matching with an adjustment range limited only by the coherence length of the source laser. This eases fabrication tolerances for the coherent beam combining system, as the physical lengths of the fibers become less important so long at the optical path length mismatch is less than the seed laser coherence length.

To start, applying the phase modulation signal to each arm of the interferometer (array) allows electronic path length matching with an adjustment range limited only by the coherence length of the source laser. This greatly alleviates the fabrication precision for making the coherent beam combining system, as the physical lengths of the fibers become less important. For example, a source laser with 1 kHz linewidth could be utilized with a path-length mismatch of over 3 km (e.g., 10 km) and still maintain high combining efficiency.

This electronic-domain, RF-scale path-length compensation offers several advantages over other compensation techniques, including:

Simplified implementation of an electronically controlled coherence function alignment system using a binary modulation pattern (e.g., phase modulation between 0 and π phase) through reduced linearity requirements on the RF amplifiers used to drive the phase modulators;

Reduced coupling to the optical carrier phase control system by adjusting the coherence of the interferometer arms instead of changing their actual optical path lengths;

Compatibility with bandwidth expansion using multiple phase modulators placed in series in each arm, with time delays between phase modulators to multiply the optical bandwidth (and SBS suppression) for a given pseudo random binary sequence (PRBS) bitrate;

Sub-second laser system turn-on times made possible by the electronic compensation of turn-on transients in the path length differences between channels;

Enhanced reliability compared to the case where all amplifiers in the system are seeded by a common broadened source laser, as failure of a broadening component should affect only the amplifier in that channel; and High-speed beam steering of phased arrays achieved deterministically on sub-millisecond timescales through all-electronic control of the coherence function.

Coherent beam combining can be carried out according to the following methods and/or with the following systems. To coherently combine a first laser beam and a second laser beam, for example, the phases of the first and second laser beams can be modulated with first and second copies, respectively, of a pseudo-random bit sequence (PRBS). A photodetector measures a cross-correlation of an electric field the first laser beam with an electric field of the second laser beam. This cross-correlation is used to set the relative phase between the first and second copies of the PRBS. Setting the relative phase can compensate for a path length mismatch (e.g., equal to at least one-tenth of a wavelength of a radio-frequency carrier of the PRBS) between the optical paths traversed by the first and second laser beams. The first and second laser beams can be generated by splitting a seed laser beam with a coherence length at least ten times longer than the path length mismatch.

Setting the relative phase can be accomplished by electronically shifting the first copy of the PRBS with respect to the second copy of the PRBS. It can be accomplished without changing the lengths of the optical paths traversed by the first or second laser beams. Setting the relative phase may involve shifting the first (and/or second) copy of the PRBS by at least half of a length of the PRBS. The relative phase shift can also steer a beam produced by interfering the first laser beam and the second laser beam.

The first and second copies of the PRBS can be generated by first and second pattern generators, respectively, both phase-locked to the same master oscillator. In this case, setting the relative phase between the first copy of the PRBS and the second copy of the PRBS comprises adjusting a clock rate of the first pattern generator relative to a clock rate of the second pattern generator. If desired, the relative optical carrier phase between the first laser beam and the second laser beam can be locked or adjusted as well.

A coherent beam combining system may include a seed laser, first and second beam splitters, first and second signal generators, clock, first and second phase modulators, first and second optical amplifiers, photodetector, and circuitry. In operation, the seed laser, which may have a coherence length of 1 km or more, emits a seed laser beam. The first beam splitter splits the seed laser beam into a first laser beam and a second laser beam. The first and second signal generators generate first and second copies, respectively, of a pseudo-random bit sequence (PRBS). The variable clock, which is operably coupled to the first signal generator, varies a relative phase between the first and second copies of the PRBS. The first and second phase modulators modulate the phases of the first and second laser beams with the first and second copies, respectively, of the PRBS. The first and second optical amplifiers amplify the first and second laser beams. The second beam splitter combines the first and second laser beams. The measures a cross-correlation of the electric fields of the first and second laser beams. And the circuitry, which is operably coupled to the photodetector and the variable clock, sets the relative phase between the first copy of the PRBS and the second copy of the PRBS based on the cross-correlation of the first laser beam with the second laser beam.

The circuitry can set the relative phase to compensate for a path length mismatch between an optical path traversed by the first laser beam and an optical path traversed by the second laser beam, where the path length mismatch corresponds to a temporal delay of at least one-tenth of a speed of light in optical fiber divided by a bit rate of the PRBS. The circuitry can also be configured to set the relative phase to steer a beam produced by interfering the first laser beam and the second laser beam. The circuitry can be implemented with a field-programmable gate array programmed to maximize a power incident on the photodetector by setting the relative phase between the first copy of the PRBS and the second copy of the PRBS. It can also be implemented with a master oscillator to emit a reference clock signal; a demodulator, operably coupled to the photodetector, to produce an error signal representing the cross-correlation; and a phase-locked loop, operably coupled to the variable clock, the master oscillator, and the demodulator, to lock a phase of the variable clock to the reference clock signal based on the error signal.

The coherent beam combining system can also include an optical phase controller that is operably coupled to the photodetector and a third phase modulator that is in optical series with the first phase modulator and operably coupled to the optical phase controller. The optical phase controller generates an optical carrier phase shift compensating a relative optical carrier phase difference between the first laser beam and the second laser beam. And the third phase modulator applies the optical carrier phase shift to the first laser beam.

Another method of coherently combining first and second laser beams includes modulating the phases of the first and second laser beams with respective copies of a PRBS and measuring a cross-correlation of the electric fields of the first and second laser beams. This cross-correlation is used to set the relative phase between the copies of the PRBS, without changing an optical path traversed by the first laser beam or an optical path traversed by the second laser beam, to compensate for a path length mismatch between these optical paths corresponding to a temporal delay of at least one-tenth of a speed of light in optical fiber divided by a bit rate of the PRBS.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

DETAILED DESCRIPTION

Figure 1A:
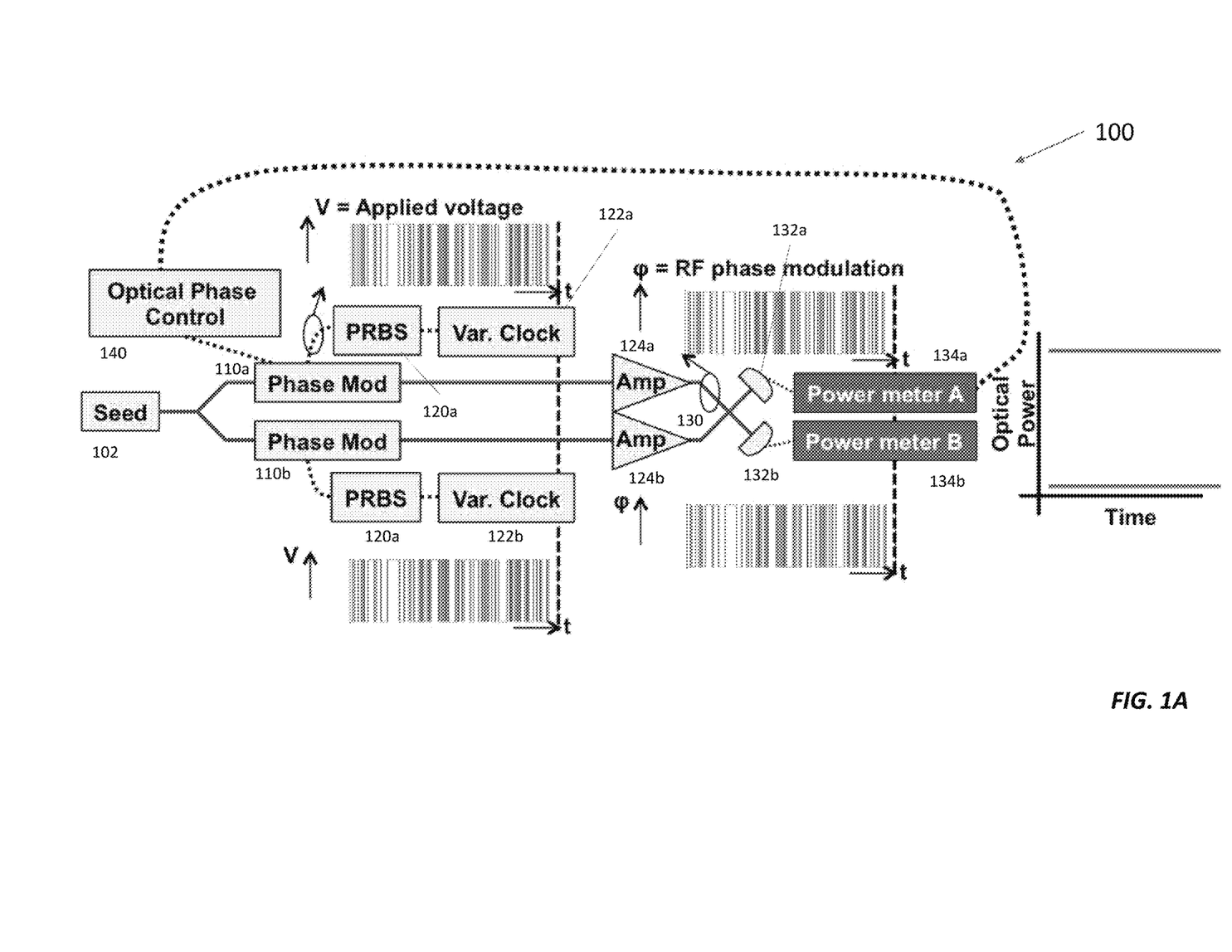
FIG. 1A shows an all-fiber, two-arm coherent beam combining system with zero path-length difference between interferometer arms. Note the alignment of the applied voltage and resulting RF modulation. The interferometer is optically phased to emit light from port A (coupled to power meter A) and not port B.

FIG. 1A shows a coherent beam combining system 100 with two channels or arms, each of which contains a fiber amplifier 124a, 124b (collectively, fiber amplifiers 124). (Other coherent beam combining systems may have tens or even hundreds of parallel arms for higher power output.) The fiber amplifiers 124 are seeded with respective copies of seed laser beam from a fiber-coupled seed laser 102. The fiber amplifiers 124 amplify these copies, and a beam splitter 130 combines them to produce a high-power output at port A as measured by photodetector 132a coupled to power meter A/134a and little or no power at port B as measured by photodetector 132b coupled to power meter B/134b (collectively, power meters 134).

A fiber-coupled phase modulator 110a, 110b (collectively, phase modulators 110) is placed before the amplifier 124a, 124b in each arm of system 100 to broaden the linewidth of the laser beams with pseudo-random bit sequence (PRBS) modulation in order to suppress SBS. Each phase modulator 110a, 110b has a DC port that can be used for modulo-$2\pi$ optical phase control and an RF port. The DC port of the phase modulator 110a in one arm is coupled to an optical phase controller 140 that controls the static phase offset between the two arms of the coherent beam combing system 100 based on the power ratio measured by the photodetectors 132. The optical phase controller 140 may control the optical carrier phase by dithering the phase at a rate of about 1 MHz and monitoring the dither frequency. For a coherent beam combining system with N arms, the optical phase controller 140 or a set of optical phase controllers can be used to control the static phase offsets of N−1 arms with respect to a common reference arm for cohering the optical carriers propagating in all N at the beam-combining plane.

The RF port of each phase modulator 110a, 110b is coupled to a corresponding PRBS signal source 120a, 120b (collectively, PRBS signal sources 120), each of which is coupled to a corresponding variable clock 122a, 122b (collectively, variable clocks 122). The PRBS signal sources 120 drive the phase modulators 110 with identical PRBS waveforms with GHz-class bit rate to suppress SBS. These vertical waveforms are represented in FIG. 1A as applied voltage waveforms (V). The variable clocks 122 adjust the relative phase between the PRBS waveforms to account for RF path length mismatch; that is, they are used to align the PRBS waveforms in time as indicated by the dashed vertical line at the right edges of the applied voltage waveforms in FIG. 1A.

Each PRBS generator 120 is connected to its own variable clock 122, which determines the point in time that each bit in the PRBS waveform is generated by the PRBS generator 120. The clocks 122 are locked to a common reference (not shown) so they are phase stable. However, the two-arm system 100 shown in FIG. 1A can operate with a variable clock 122 in only one arm, as that variable clock 122 changes the relative RF phase between the PRBS patterns in the two arms. An N-arm system would operate with N−1 variable clocks 122 and one static clock, all locked to a common reference. In operation, there is a slight detuning (relative to the baseline PRBS clock rate) applied to each variable clock to adjust the RF phase. Once the PRBS patterns are aligned and fringe contrast is maximized, the detuning can be removed and the clocks can continue oscillating, locked in phase to the common reference.

While the PRBS modulation locally broadens the optical spectrum of the seed, the lengths of the interferometer arms (the optical path lengths in the upper and lower arms) are matched exactly so the radio-frequency (RF) phase modulation patterns line up at the beam combination plane (beam splitter 130), making the phase modulation common to both beams. Because the phase modulation pattern is common mode, the residual differential optical phase caused by the surrounding environment can be controlled with a micron-class dynamic range control loop implemented by the optical phase controller 140.

Figure 1B:
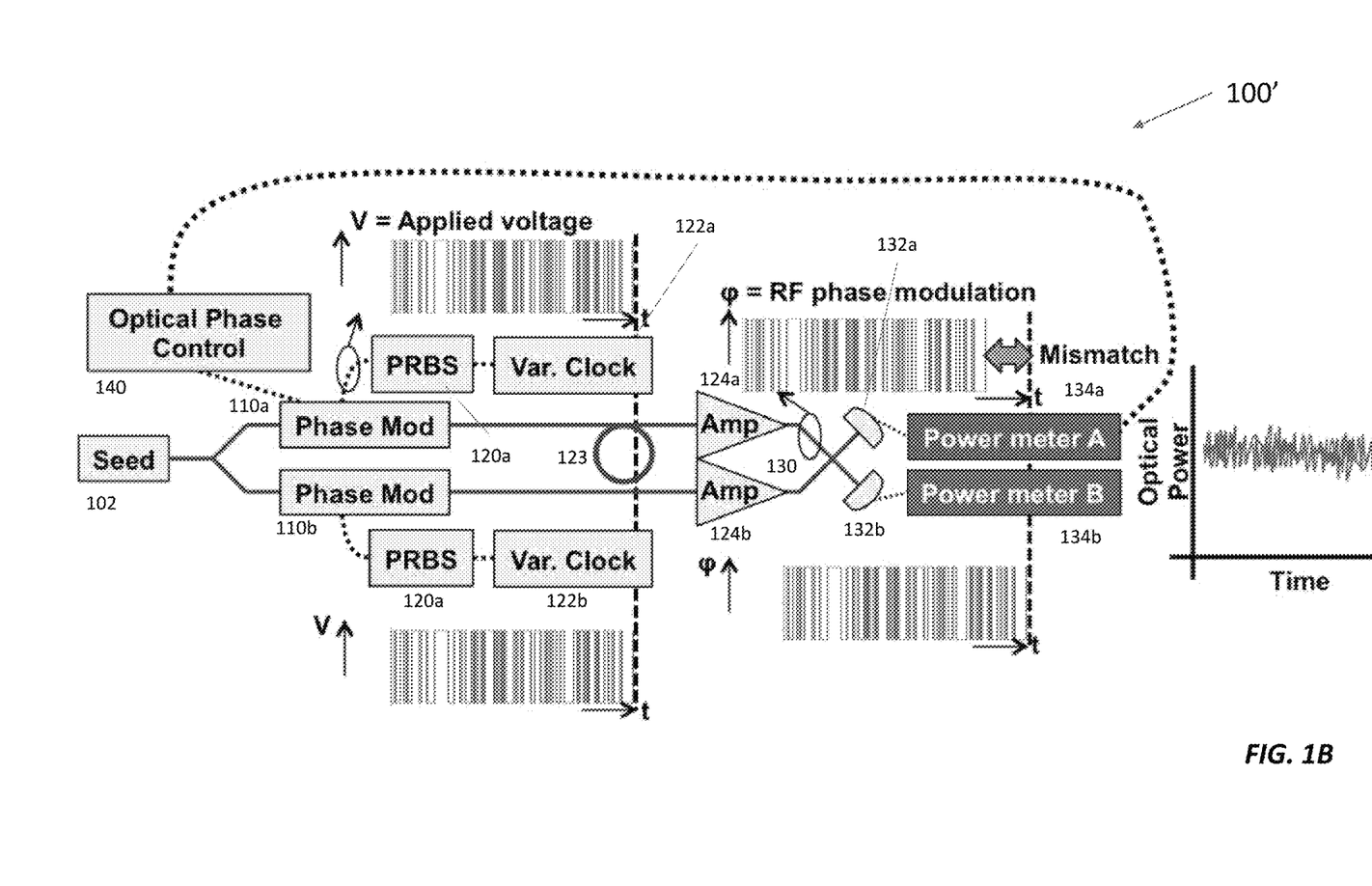
FIG. 1B shows the all-fiber, two-arm coherent beam combining system of FIG. 1A with a path-length difference between interferometer arms of millimeters or more. An extra loop of fiber in the upper arm mismatches the RF phase modulation at the combination plane. This degrades the interference fringe contrast, reducing the output power at port A and increasing the output power at port B, which results in a net loss in combination efficiency. Put differently, mismatched RF phase modulation doesn't totally destroy the ability to control phase unless the value of the coherence function is essentially zero at the value of the mismatch. But mismatched RF phase modulation can degrade the fringe contrast.

FIG. 1B shows the two-channel coherent beam combining system 100' with mismatched optical path lengths in the interferometer. The optical path length mismatch is represented in FIG. 1B as an extra length of fiber 123 in the upper arms and can be static and/or dynamic. This optical path length mismatch is equivalent to a significant fraction of the PRBS period (e.g., one-tenth or more of the duration of a bit in the PRBS pattern or one-tenth of more of the RF carrier wavelength of the PRBS) and causes a misalignment of the phase modulation patterns at the beam combination plane (beam splitter 130). (Shorter path length mismatches generally don't misalign the PRBS patterns.) The result of this misalignment is differential modulation of the optical phase at the RF modulation rate.

At GHz modulation rates, it becomes impractical, if not impossible, to control the optical phase differences with a control loop like the one implemented with the optical phase controller 140. The inability to control the optical phase at the combination plane occurs for similar reasons in current coherent beam combination systems where spectral broadening is performed just after the seed laser and before the split. One method for dealing with the inability to effect phase control due to path length mismatches is to measure each fiber and then cut and splice new fiber into the system to match the path length of each arm to a small fraction of the broadened source coherence length (e.g., about 1 cm). This "measure, cut, splice" process realigns the RF phase modulation at the combination plane, restoring the common-mode nature of the modulation.

Electronic Path-Length Compensation in Coherent Beam Combining

FIGS. 2A-2D illustrate a coherent beam combining system 200 that electronically corrects the optical path-length mismatches between a pair of interferometer arms. The system 200 can correct RF-scale optical path-length mismatches as well as path-length mismatches significantly larger than RF-scale. However, if the optical path-length mismatch is greater than the speed of light in the optical fiber divided by the PRBS bit rate, then the fringe contrast is effectively zero and the system 200 hunts for the proper RF phase to restore some fringe contrast and align the patterns to within the speed of light in the optical fiber divided by the PRBS bit rate such that there is some fringe contrast to optimize.

Figure 2A:
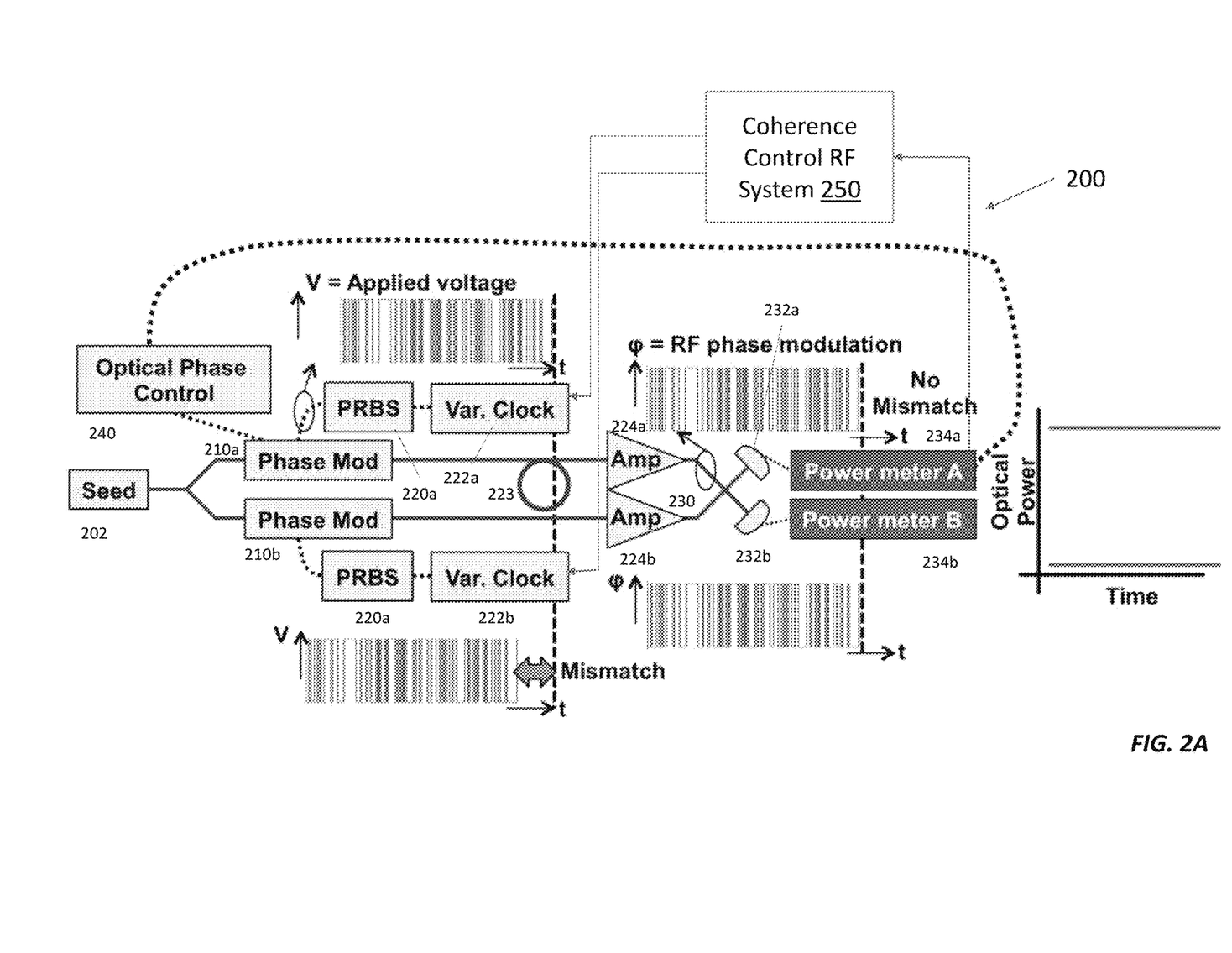
FIG. 2A shows an all-fiber, two-arm coherent beam combining system with a path-length difference between interferometer arms of millimeters or more and a coherence control system. The coherence control system adjusts the phase of the RF clocks to account for the path length difference, restoring alignment of the RF phase modulation at the combination plane. The lower applied voltage pattern is shifted in time to align the output RF phase modulation patterns and the upper applied voltage is in its original position.

This system 200 includes a fiber laser 202 or other fiber-coupled source that generates a seed laser beam with a long coherence length and narrow linewidth (e.g., a coherence length of 1 km or longer and a linewidth on the order of kilohertz). The seed laser beam is split into first and second laser beams that pass through upper and lower arms, respectively, of a fiber-based Mach-Zehnder interferometer. The arms of the interferometer have different optical path lengths as illustrated by the extra fiber loop 223 in the upper arm. Again, this extra fiber loop 223 represents a path length mismatch that is equivalent to a temporal mismatch of one-tenth or more of the bit period of the PRBS waveform.

Each arm of the interferometer includes a corresponding phase modulator 210a, 210b (collectively, phase modulators 210) whose output is coupled to the input of a corresponding fiber amplifier 224a, 224b (collectively, fiber amplifiers 224). A fiber beam splitter 230 combines the amplified outputs of the fiber amplifiers 224, sending a high-power output to port A, which is coupled to a photodetector 232a and a power meter 234a, and little to no power to port B, which is coupled to a photodetector 232b and a power meter 234b (collectively, photodetectors 232 and power meters 234). The power detected by the photodetector 232a at port A represents the cross-correlation of the electric fields of laser beams phase-modulated by the PRBS sequences.

Each phase modulator 210 has a DC port and an RF port. The DC port of the phase modulator 210a in the upper arm of the interferometer is driven by an optical phase controller 240 to provide static or slowly changing modulo $2\pi$ phase control based on the relative average power levels detected by the power meters 234. The RF ports of the phase modulators 210 are driven by respective PRBS signal sources 220a, 220b, which are coupled to respective variable clocks 222a, 222b (collectively, PRBS signal sources 220 and variable clocks 222). As in the coherent system 100 in FIGS. 1A and 1B, the PRBS signal sources 210 drive the phase modulators with gigahertz-rate PRBS waveforms. The PRBS waveforms have the same sequences of bits but are dynamically shifted in time with respect to each other by the variable clocks 222 and a coherence control RF system 250 that controls the rates of the variable clocks 222 based on the output of one power meter 234.

Figure 2B:
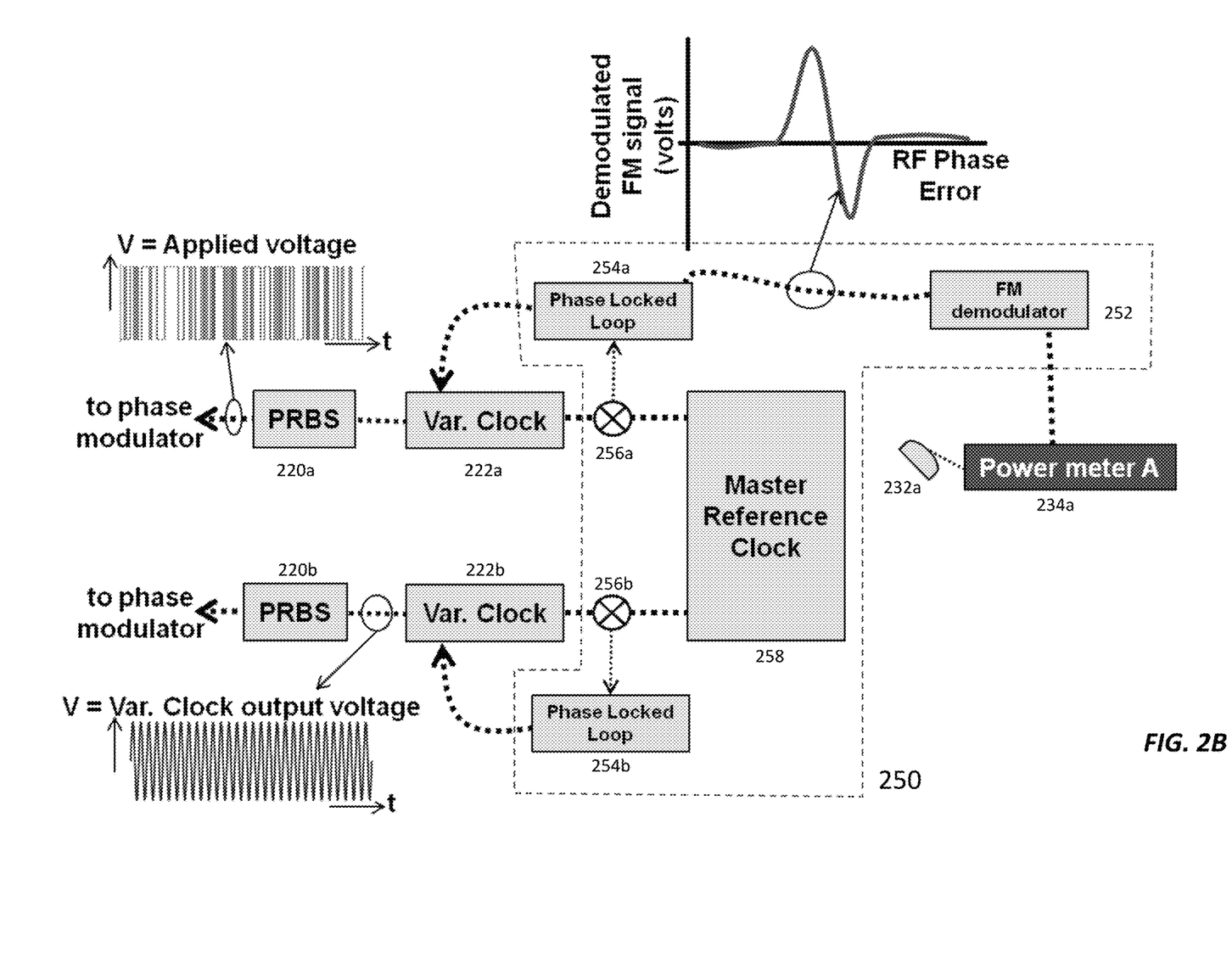
FIG. 2B shows a coherence control RF system suitable for use in the coherent beam combining system of FIG. 2A.

FIG. 2B shows the coherence control RF system 250 in greater detail. It includes a frequency modulation (FM) demodulator 252, a pair of phase-locked loop 254a and 254b, a pair of mixers 256a and 256b, and a master oscillator or reference clock 258. The FM demodulator 252 has an input coupled to one of the power meters (e.g., power meter 234a) and an output coupled to one of the phase-locked loops (here, phase-locked loop 254a). The FM demodulator 252 produces a demodulated FM signal (upper right) that represents the RF phase error in the PRBS waveform detected by the photodetector 232a at port A. The phase-locked loop 254a uses this demodulated FM signal to lock the variable clock 222a to the master reference clock 258 via the mixer 256a. Similarly, the other phase-locked loop 254b locks the other variable clock 222b to the master reference clock 258. Stabilizing the variable clocks 222 to the master reference clock 258 ensures phase coherence between the variable clocks 222.

In practice, each mixer 256 acts as a phase detector which outputs an error signal proportional to the phase difference between a voltage-controlled oscillator (VCO), which is inside the corresponding phase-locked loop 254, and the master reference clock 258. The output of each VCO is connected to the corresponding variable clock 222, such that the whole arrangement results in the variable clock 222 being locked to the master reference clock 258.

In operation, the phase-locked loop 254a varies the clock rate of the first variable clock 222a with respect to the clock rate of the second variable clock 222b in response to variations in the detected power at Port A as represented by the demodulated FM signal. By temporarily changing the rate of one variable clock relative to another, the PRBS pattern can be shifted forward or backward in time until the phase modulation patterns align at the beam combination plane (beam splitter 230), at which point the variable clocks 222 can be returned to the same frequency (this can also be accomplished by shifting the phase of the clock). Once the phase modulation patterns are realigned at the combination plane, the phase modulation is common-mode again, restoring the ability to control the differential phase with a low-bandwidth control loop (e.g., the optical phase controller 240). This alignment technique corrects for the RF-scale optical path length mismatch 223 and can be extended to tens or dozens of parallel arms for higher power outputs, with each arm being aligned to the same reference arm (e.g., the lower arm in FIG. 2A).

Figure 2C:
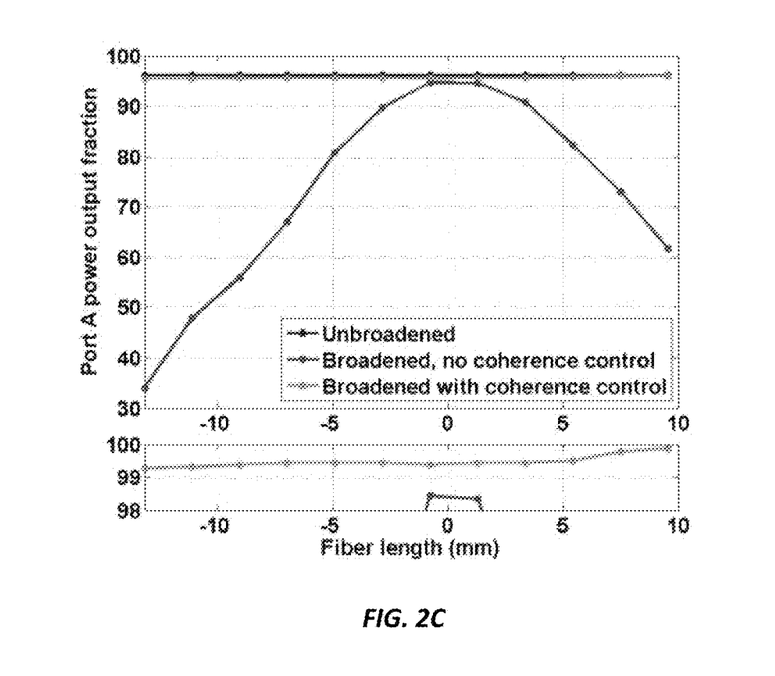
FIG. 2C shows a measurement of the power out of port A of the system pictured in FIG. 2A as the path length difference between the interferometer arms is varied in a stepwise fashion.

FIG. 2C shows plots of the fractional Port A power output versus optical path length mismatch in fiber for the system 200 in FIGS. 2A and 2B with PRBS broadening and no coherent control (bottom trace), with PRBS broadening and coherent control (middle trace), and without PRBS broadening (i.e., no modulation) or coherent control (top trace). Data in the lower plot has been re-normalized against the unbroadened values to account for non-idealities in the experimental setup, such as mismatched splitting and reduced polarization extinction ratio. The width of the peak in the broadened but uncontrolled case (lowest trace in both upper and lower plots) agrees well with values expected for a bit rate of approximately 10 GHz. The reduction in output power in the lower plot for the controlled case (middle trace in upper plot; upper trace in lower plot) is likely due to the finite modulation required for control. The range demonstrated was chosen for convenience and that there was an additional path length mismatch in the experimental setup in excess of 2 meters which the system had already corrected for.

In FIG. 2C, changing the optical path length mismatch between two arms of an interferometer in a stepwise fashion without the coherence control system on, the coherence function of the PRBS source is traced out (bottom trace). Enabling the coherence control system allows broadening of the coherence function to that dictated by the source laser linewidth (upper traces). The difference between broadened, coherently controlled operation and unbroadened operation cannot be resolved within the limits of FIG. 2C.

Figure 2D:
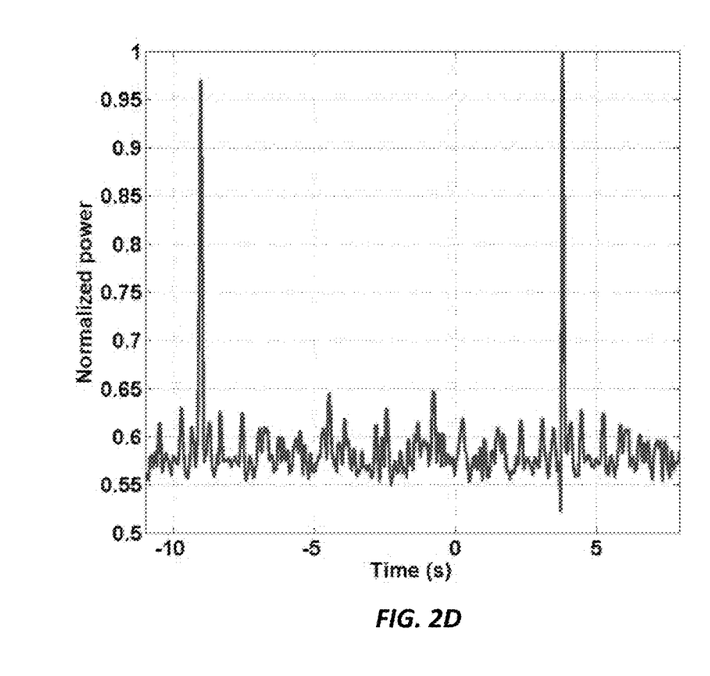
FIG. 2D is a plot of the power out of the one port of the two-arm interferometer in FIG. 2A.

FIG. 2D is a plot of the normalized power versus time at Port A of the interferometer in FIG. 2A operating with a 128-bit PRBS pattern at 12 GHz. A static offset frequency of 10 Hz was set between the variable clocks driving the two PRBS pattern generators. The two peaks correspond to points in time where the PRBS patterns applied to each arm align perfectly at the combination plane, allowing high efficiency power transfer out of the desired port. For a 128-bit PRBS pattern applied at 12 GHz, offsetting the clocks to 10 Hz aligns the PRBS patterns every 12.8 seconds. Throughout the entire time trace, the phase control system aligns the optical phase of the two arms once the RF phase modulation patterns come into alignment.

Figure 3A:
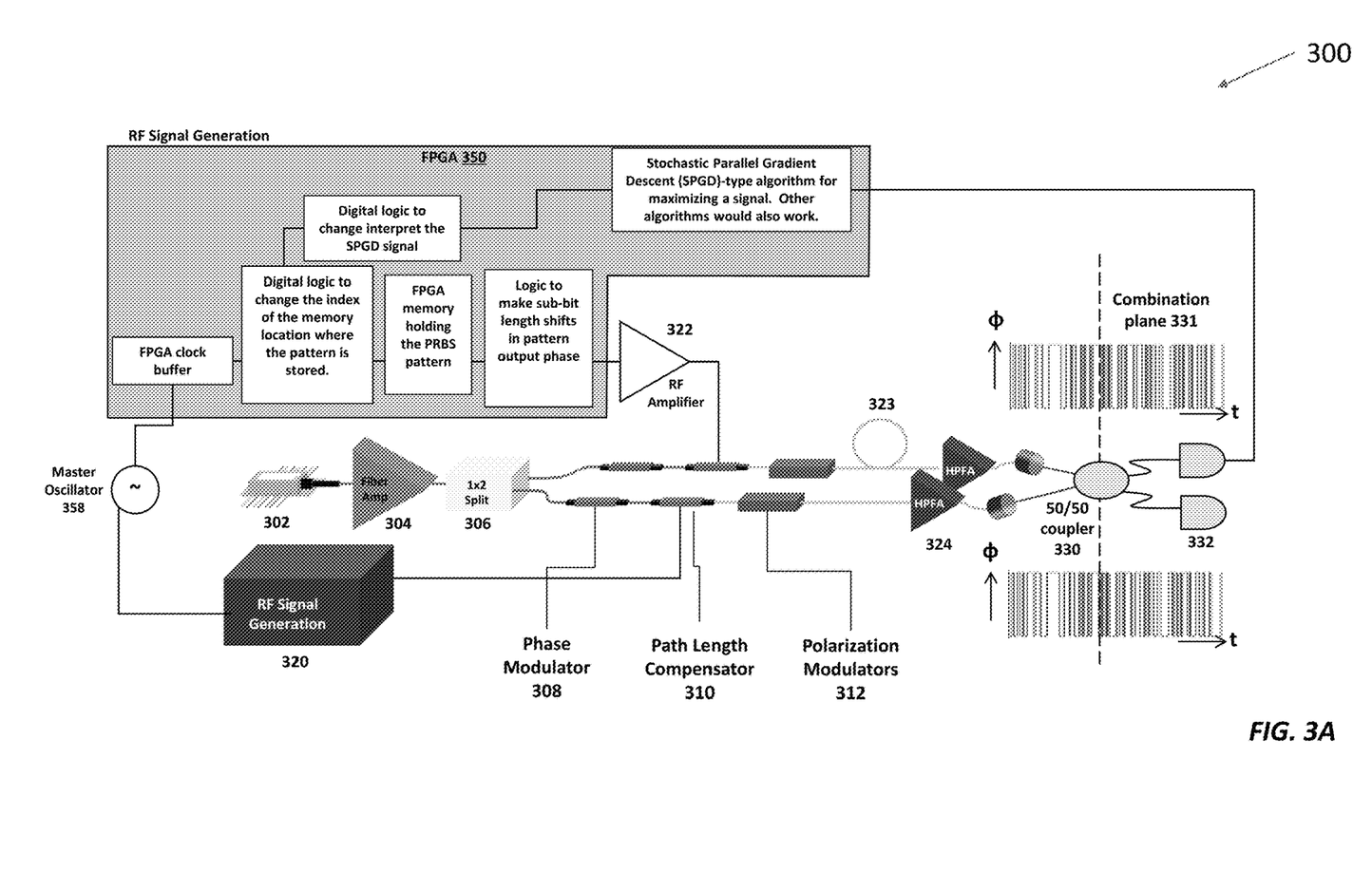
FIG. 3A illustrates a coherent beam combining system with coherence control with extended dynamic range (CCEDR) implemented using a field-programmable gate array (FPGA).

FIG. 3A illustrates coherence control with extended dynamic range using a field-programmable gate array (FPGA) in a coherent beam combining system 300. This system 300 includes a fiber-coupled seed laser 302, such as a distributed feedback (DFB) laser, that emits a narrow linewidth seed laser beam. A fiber amplifier 304 coupled to the seed laser 302 amplifies the seed laser beam before a fiber beam splitter 306 splits the amplified seed laser beam into first and second laser beams and couples them into first and second arms, respectively. (This system 300 has two arms, but other systems using the same or similar coherence control may have more up to dozens of arms.) There is an RF-scale path length mismatch between the arms represented by the extra fiber loop 323.

Each arm of the coherent beam combining system 300 includes a phase modulator 308 in series with an optical path length compensator 310, optional polarization modulator 312, and high-power fiber amplifier (HPFA) 324. The phase modulators 308 are used to adjust the phases of the optical carrier of the corresponding laser beams, e.g., with an optical phase controller (not shown) like the one shown in FIG. 2A. The optical path length compensators 310 can be implemented as GHz-bandwidth electro-optic modulators. An RF signal generator 320 locked to a master oscillator 358 drives the optical path length compensator 310 in the one arm with one copy of a GHz-rate PRBS waveform. The FPGA 350, which is also locked to the master oscillator 358, drives the optical path length compensator 310 in the other arm with a phase-shifted copy of the same PRBS waveform via an RF amplifier 322 to level the PRBS waveform amplitudes. The PRBS waveforms broaden the linewidths of the laser beams while the phase shifting compensates for the RF-scale optical path length mismatch 223 between the arms.

If desired, the polarization modulators 312 can be used to align the polarization states of the laser beams for peak fringe contrast at the output. The HPFAs 324 amplify the laser beams, which are combined in a 50/50 beam combiner 330 at a combination plane 331. Photodetectors 332 detect the power levels at the output ports of the beam combiner 330. These power levels represent cross-correlations of the electric field amplitudes of the laser beams incident on the photodetectors.

The FPGA 350 is coupled to one of the photodetectors 322 and uses the photodetector output to set the phase offset between the PRBS waveforms that drive the path length compensators 310. The FPGA 350 includes a clock buffer to store the recent output of the master oscillator 358 and a memory to store the PRBS waveform. The FPGA 350 is programmed to use stochastic parallel gradient descent (SPGD) or another similar algorithm to maximize the photodetector output; at the maximum, all of the power is incident on the photodetector coupled to the FPGA 350, indicating that the phase offset compensates perfectly for the RF-scale path-length mismatch between the arms. Digital logic in the FPGA 350 interprets the SPGD signal and uses the result to change the index of the memory location that stores the PRBS waveform. The memory is large enough (i.e., has enough locations) for the PRBS waveform to be shifted forwards or backwards by more than half of its length. Additional logic makes sub-bit length shifts in PRBS pattern output phase. Together, the change in index and sub-bit length shifts the relative phase of the PRBS waveform to maximize the photodetector output, compensating for the RF-scale path length mismatch 323 between the interferometer arms.

Figure 3B:
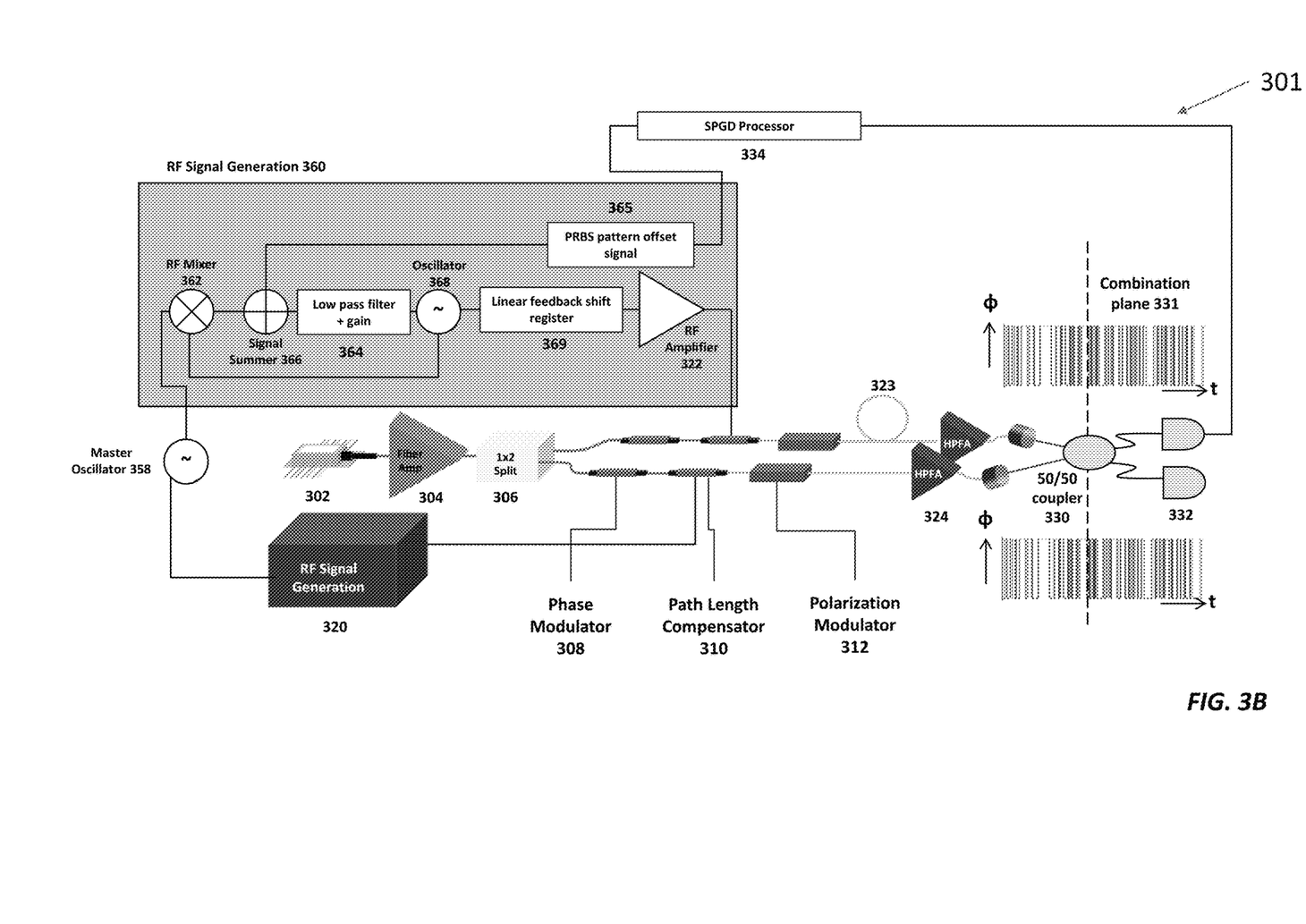
FIG. 3B illustrates a coherent beam combining system with CCEDR implemented using analog RF electronics.

FIG. 3B shows a coherent beam combining system 301 with coherence control implemented using analog RF electronics 360 instead of an FPGA. A hill-climbing algorithm (e.g. SPGD) processor 334 attempts to maximize the output of a photodetector 332 coupled to one output port of the beam splitter 330. The SPGD processor 334 generates an error signal that another block 365 transforms into an offset for the PRBS waveform used to drive the optical path length compensator 310 in the upper arm of the coherent beam combining system 301. A signal summer 366 adds this offset to filtered and amplified version of the output from the mixer 362, which is coupled to the signal summer 366 and then a low-pass filter and amplifier stage 364. The output of the signal summer 366 modulates the phase of an oscillator 368 that clocks the PRBS waveform out of a linear-feedback shift register (LFSR) 369. This phase modulation changes the offset of the PRBS waveform from the LFSR 369, compensating for the optical path length mismatch 223 in the electronic domain. Because the coherence length of the seed laser 302 is much longer than the coherence length of the phase modulated light, the phase of the LFSR output pattern can be slipped by many multiples of the PRBS pattern length (forwards or backwards) without consequence.

Advantages of Electronic Path-Length Mismatch Compensation

There are many benefits of the electronic path-length mismatch compensation shown in FIGS. 2A-2D, 3A, and 3B. To start, the adjustment range can be extremely large—for example, the adjustment range can be close to the seed laser's coherence length, which may be up to 10 km. This is because: (1) the coherence length of the laser is very long; (2) the clocks reading out the PRBS patterns are phase-locked together and have sub-chip residual jitter; and (3) the electronics can adjust the relative phase of the PRBS patterns by more than ±½ of a pattern, allowing access to all possible relative pattern alignment conditions. All of these benefits are available because the PRBS phase modulation pattern is common to all arms of the interferometer and because control over the individual readout clocks allows arbitrary control over the relative phase of the modulation pattern(s).

There is another limit associated with implementation of the array of clocks that read out the PRBS patterns: high-frequency residual jitter not compensated by the phase-locked loop between clocks can result in a time-averaged misalignment of the PRBS patterns. Typically, the residual jitter should be less than 1/10th of the smallest chip duration; for a 10 GHz PRBS pattern, the period is 100 ps, so the residual jitter should be less than 10 ps. This is achievable with state-of-the art electronics, which can operate with residual jitter of 3 ps or less (e.g., 1 ps), or with mode-locked lasers, which can operate with residual jitter of 100 fs or less.

In practice, the modulation pattern has a finite length, so the time delay can be adjusted by up to half of the pattern length (e.g., 27/2 bit periods for a 27-bit PRBS pattern length) as long as the total path-length mismatch is less than the coherence length of the source laser (typically tens of meters to a kilometer). The SBS suppression generally increases as the peak power spectral density of the optical spectrum decreases, which is generally achieved by (a) increasing the PRBS modulation rate and (b) increasing the PRBS pattern length so that the overall spectral width is filled with at least one spectral line per frequency bin with size equal to the SBS linewidth.

Using a binary modulation pattern (e.g., phase modulation between 0 and π phase) simplifies implementation of an electronically controlled coherence function alignment system primarily by reducing the linearity requirements of the RF amplifiers used to drive the phase modulators. If the PRBS pattern switched among more than two values, then the RF amplifiers would have to be perfectly linear or nonlinear in exactly the same way to ensure the same phase modulation patterns are applied to the two laser beams. Switching the PRBS pattern between two values (e.g., 0 and π) means that the two arms receive the same phase modulation pattern if the RF amplifier gain is adjusted properly. Operating the amplifiers in heavy saturation to achieve the voltage range for 0-π modulation removes or suppresses much of the remaining sensitivity of the amplifier to temperature or manufacturing differences.

The coupling to the phase control system used to lock the interferometer arms can be reduced because the actual optical path lengths of the interferometer arms are not changed as part of the electronic path-length mismatch compensation. The lack of coupling between (i.e., independence of) coherence control and phase control greatly simplifies control schemes used for scaling the bandwidth (i.e., the bit rate) to 40 GHz and beyond, which should enable SBS-limited power scaling of fiber amplifiers beyond 4 kW per amplifier. (In general, SBS-limited power increases as bit rate increases, as long as the pattern length is increased proportionally to ensure the individual spectral lines are not separated by substantially more than (e.g., twice) the Brillouin bandwidth.) This may be particularly useful in mitigating higher-order-mode (HOM) instabilities in multimode core fiber amplifiers, as the increased bandwidth can allow high power operation with fiber core sizes closer to those that guide only one spatial mode.

Decoupling between the RF signal coherence and optical phase is achieved because shifting the PRBS patterns simply results in a difference in the point in time where a PRBS phase jump is applied. Specifically, shifting the PRBS pattern does not shift the phase of the underlying optical carrier. Because the optical phase is not shifted as the RF phase is shifted, dither-based methods for controlling RF phase modulation pattern alignment do not directly interfere with similar methods used for optical phase alignment. There is still a possibility for coupling in that both methods rely on power modulation for discriminator detection; however, careful modulation frequency selection can mitigate this problem substantially. This mitigation can be achieved by assigning each channel its own dedicated time slot or modulation frequency to ensure unique detection of information on that channel.

Multiple phase modulators can be placed in series in each arm, with a specific time delay between them that effectively multiplies the optical bandwidth (and SBS suppression) for a given PRBS bitrate. For example, four 10 GHz modulators can be placed in series and modulated with time-delayed versions of the same 10 GHz PRBS pattern to broaden the linewidth by up to 40 GHz. The coherence control scheme is fully compatible with this bandwidth expansion method. Phase modulators connected in series can be treated as if they were a single phase modulator within the coherence control system. The changes in PRBS pattern phases that adjust for arbitrary path length differences are not affected by the existence of multiple modulators.

Because the coherence function is controlled completely electronically, high-speed beam-steering of phased arrays and other functionality can be deterministically achieved on sub-millisecond timescales. For example, to achieve beam-steering slew rates on the order of 20 deg/s over a field of regard of ±55 degrees, dynamic path length differences on the order of >600 ps/s and with peak amplitudes as large as about 1 ns should be compensated. This is much more readily achieved in the RF domain than in the physical domain, where slow, bulky, motor-driven devices compensate for path length changes. The limitation in the RF domain is primarily the settling time of the phase-locked loops controlling the variable clocks. These settling times can easily be sub-millisecond in duration.

Applications of Electronic Path-Length Mismatch Compensation

Electronic path-length mismatch compensation can be applied to high-energy lasers (HELs) and especially high-energy fiber lasers. The fact that the patterns are aligned at the combination plane means that the HEL emits a single combined beam with one common PRBS phase modulation pattern. The PRBS pattern, although useful for SBS suppression, could also contain binary data. Thus, the HEL can also be used for free-space laser communications, potentially with encryption. As the PRBS patterns can also be used to modulate lower bandwidth data with a unique code as in code division multiple access (CDMA) systems, it provides for multiple users in one access area (e.g., multiple HEL-based communication terminals).

If a small portion of the high-energy laser beam is reflected off a remote target, range information can be obtained by heterodyne interferometry, utilizing an appropriately frequency-shifted local pickoff of the HEL beam. Thus, the HEL can be used as a LADAR transmitter.

The SBS suppression and high-efficiency beam combination benefits of electronic path-length mismatch compensation are equally applicable to both continuous wave (CW) and pulsed lasers, where the temporal pulse width is substantially greater than the inverse of the PRBS modulation rate.

Practical Implementations of Electronic Path-Length Mismatch Compensation

FIGS. 2C and 2D illustrate the functionality of electronic path-length mismatch compensation. Implementation of this compensation in a real system may involve overcoming two more challenges: initial alignment of the PRBS patterns and maintaining pattern alignment during operation. The control systems should start with both PRBS patterns aligned quite closely to the ideal value (e.g., within the peaks in the demodulated FM signal in FIG. 2B). If the PRBS patterns are misaligned by more than a chip, the time-averaged signal may become the same for all other offsets, making it difficult to impossible to determine a local derivative through small perturbative measurements for deterministically improving the PRBS pattern alignment.

In the case of the all-fiber interferometers pictured in FIGS. 2A, 3A, and 3B, the coherence control system tries to maintain alignment of the PRBS patterns, ensuring that all or substantially all of the input power exits the interferometer at the desired output port. Finding the correct alignment initially can be straightforwardly achieved using the proposed system. Introducing a static frequency offset between the variable clocks (e.g., on the order of 1 Hz) changes the relative phase between the PRBS patterns impressed onto each arm very slowly. This allows detection of the alignment, which forces all of the input light out of only one arm of the interferometer as shown in FIG. 2D. This phase location can be recorded and used as a starting point for the dynamic coherence control system.

There are at least two ways to align the patterns for dynamically tracking the coherence function. The first way is to phase modulate the PRBS pattern applied to each fiber at a different modulation frequency. Synchronous demodulation of the resulting power fluctuations gives information of the relative alignment of the PRBS patterns. This method is directly analogous to frequency modulation spectroscopy. The second way is to digitally shift the phase of each PRBS pattern, recording the power from the desired port resulting from each shift. By keeping the individual shifts small, the local gradient of the coherence function can be very accurately estimated, and a correction applied. For a multi-arm system, a multi-channel gradient estimation technique, such as stochastic parallel gradient descent (SPGD), can also be applied.

The control systems should start with both PRBS patterns aligned quite closely to the ideal value (e.g., within the peaks in the demodulated FM signal in FIG. 2B). If the PRBS patterns are misaligned by more than a chip, the time-averaged signal may become the same for all other offsets, making it difficult to impossible to determine a local derivative through small perturbative measurements for deterministically improving the PRBS pattern alignment.

Finally, the individual variable clocks should be stable, e.g., over a duration substantially greater than the maximum temporal path-length mismatch. A clock's stability can be characterized as a jitter value. Jitter is the root-mean-square (RMS) value calculated as the integral of the phase noise spectrum of the oscillator. Typically, jitter is calculated from the highest relevant frequency (in this case the duration of one chip) to the frequency where the phase-locked loop keeping the channel oscillator in phase with the master oscillator loses effectiveness (e.g., 100 kHz to 1000 kHz). This is the band where the phase-locked loop cannot suppress phase differences between the channel oscillator associated with each optical channel.

Practically, the jitter integration can be carried out from a high frequency where the measured phase noise spectrum intercepts the measurement noise floor. For any phase noise spectrum where the shape of the spectrum falls with frequency, the quantity that matters the most tends to be the value of the phase noise spectrum beyond which the average spectrum falls monotonically with frequency; this point defines the integral value.

The control methods described above can be used to stabilize the (GHz class) variable clocks to a common reference oscillator for timescales from milliseconds to hours, days, or longer as shown in FIG. 2B. For shorter timescales, the intrinsic stability of the variable clocks can maintain phase alignment. Data from modern variable-frequency RF oscillators suggest inter-arm jitter on-par or somewhat below what is necessary for a practical system. Evidence of this performance appears in the experimental system performance demonstrated within this document, in particular FIG. 2D.

The coherent beam combination techniques disclosed here enable a factor of 2 to 4 increase in fiber amplifier output power, reduced HEL system size, weight, and power, as well as new HEL functionality, such as high-speed, high-efficiency, phased-array beam steering.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of coherently combining a first laser beam and a second laser beam, the method comprising:
   generating a first copy of a pseudo-random bit sequence (PRBS) with a first pattern generator phase-locked to a master oscillator;
   generating a second copy of the PRBS with a second pattern generator phase-locked to the master oscillator;
   modulating a phase of the first laser beam with the first copy of the PRBS;
   modulating a phase of the second laser beam with the second copy of the PRBS;
   measuring a cross-correlation of an electric field of the first laser beam with an electric field of the second laser beam; and
   setting the relative phase between the first copy of the PRBS and the second copy of the PRBS based on the cross-correlation of the electric field of the first laser beam with the electric field of the second laser beam.

2. The method of claim 1, wherein setting the relative phase between the first copy of the PRBS and the second copy of the PRBS comprises compensating for a path length mismatch between an optical path traversed by the first laser beam and an optical path traversed by the second laser beam.

3. The method of claim 2, wherein the path length mismatch is equal to at least one-tenth of a wavelength of a radio-frequency carrier of the PRBS.

4. The method of claim 2, further comprising:
   generating a seed laser beam with a coherence length at least ten times longer than the path length mismatch; and
   splitting the seed laser beam into the first laser beam and the second laser beam.

5. The method of claim 1, wherein setting the relative phase between the first copy of the PRBS and the second copy of the PRBS comprises electronically shifting the first copy of the PRBS with respect to the second copy of the PRBS.

6. The method of claim 1, wherein setting the relative phase between the first copy of the PRBS and the second copy of the PRBS occurs without changing a length of an optical path traversed by the first laser beam or a length of an optical path traversed by the second laser beam.

7. The method of claim 1, wherein setting the relative phase between the first copy of the PRBS and the second copy of the PRBS comprises shifting the first copy of the PRBS by at least half of a length of the PRBS.

8. The method of claim 1, wherein setting the relative phase between the first copy of the PRBS and the second copy of the PRBS steers a beam produced by interfering the first laser beam and the second laser beam.

9. The method of claim 1, wherein setting the relative phase between the first copy of the PRBS and the second copy of the PRBS comprises adjusting a clock rate of the first pattern generator relative to a clock rate of the second pattern generator.

10. The method of claim 1, further comprising:
    adjusting a relative optical carrier phase between the first laser beam and the second laser beam.

11. A coherent beam combining system comprising:
    a seed laser to emit a seed laser beam;
    a first beam splitter, in optical communication with the seed laser, to split the seed laser beam into a first laser beam and a second laser beam;
    a first signal generator to generate a first copy of a pseudo-random bit sequence (PRBS);
    a second signal generator to generate a second copy of the PRBS;
    a variable clock, operably coupled to the first signal generator, to vary a relative phase between the first copy of the PRBS and the second copy of the PRBS;
    a first phase modulator, in optical communication with the first beam splitter and operably coupled to the first signal generator, to modulate a phase of the first laser beam with the first copy of the PRBS;
    a second phase modulator, in optical communication with the first beam splitter and operably coupled to the second signal generator, to modulate a phase of the second laser beam with the second copy of the PRBS;
    a first optical amplifier, in optical communication with the first phase modulator, to amplify the first laser beam;
    a second optical amplifier, in optical communication with the second phase modulator, to amplify the second laser beam;
    a second beam splitter, in optical communication with the first optical amplifier and the second optical amplifier, to combine the first laser beam and the second laser beam;
    a photodetector, in optical communication with the second beam splitter, to measure a cross-correlation of an electric field of the first laser beam with an electric field of the second laser beam; and
    circuitry, operably coupled to the photodetector and the variable clock, to set the relative phase between the first copy of the PRBS and the second copy of the PRBS based on the cross-correlation.

12. The coherent beam combining system of claim 11, wherein the seed laser has a coherence length of at least 1 km.

13. The coherent beam combining system of claim 11, wherein the circuitry is configured to set the relative phase to compensate for a path length mismatch between an optical path traversed by the first laser beam and an optical path traversed by the second laser beam.

14. The coherent beam combining system of claim 13, wherein the path length mismatch corresponds to a temporal delay of at least one-tenth of a speed of light in optical fiber divided by a bit rate of the PRBS.

15. The coherent beam combining system of claim 11, wherein the circuitry is configured to set the relative phase to steer a beam produced by interfering the first laser beam and the second laser beam.

16. The coherent beam combining system of claim 11, wherein the circuitry comprises a field-programmable gate array programmed to maximize a power incident on the photodetector by setting the relative phase between the first copy of the PRBS and the second copy of the PRBS.

17. The coherent beam combining system of claim 11, wherein the circuitry comprises:
  a master oscillator to emit a reference clock signal;
  a demodulator, operably coupled to the photodetector, to produce an error signal representing the cross-correlation; and
  a phase-locked loop, operably coupled to the variable clock, the master oscillator, and the demodulator, to lock a phase of the variable clock to the reference clock signal based on the error signal.

18. The coherent beam combining system of claim 11, further comprising:
  an optical phase controller, operably coupled to the photodetector, to generate an optical carrier phase shift compensating a relative optical carrier phase difference between the first laser beam and the second laser beam; and
  a third phase modulator, in optical series with the first phase modulator and operably coupled to the optical phase controller, to apply the optical carrier phase shift to the first laser beam.

19. A method of coherently combining a first laser beam and a second laser beam, the method comprising:
  generating a first copy of a pseudo-random bit sequence (PRBS) with a first pattern generator phase-locked to a master oscillator;
  generating a second copy of the PRBS with a second pattern generator phase-locked to the master oscillator;
  modulating a phase of the first laser beam with the first copy of the PRBS;
  modulating a phase of the second laser beam with the second copy of the PRBS;
  measuring a cross-correlation of an electric field of the first laser beam with an electric field of the second laser beam; and
  setting the relative phase between the first copy of the PRBS and the second copy of the PRBS based on the cross-correlation of the electric field of the first laser beam with the electric field of the second laser beam, without changing an optical path traversed by the first laser beam or an optical path traversed by the second laser beam, to compensate for a path length mismatch between the optical path traversed by the first laser beam and the optical path traversed by the second laser beam corresponding to a temporal delay of at least one-tenth of a speed of light in optical fiber divided by a bit rate of the PRBS.

* * * * *